US012766899B2

(12) United States Patent
Hettig et al.

(10) Patent No.: US 12,766,899 B2
(45) Date of Patent: Oct. 20, 2026

(54) SYSTEMS AND METHODS FOR IMPROVED TRAILER JACK WHEEL ASSEMBLIES

(71) Applicant: Trailer Ball LLC, Villa Park, CA (US)

(72) Inventors: Chase Hettig, Anaheim, CA (US); Kevin Hettig, Anaheim, CA (US)

(73) Assignee: Trailer Ball LLC, Villa Park, CA (US)

( * ) Notice: Subject to any disclaimer, the term of this patent is extended or adjusted under 35 U.S.C. 154(b) by 277 days.

(21) Appl. No.: 18/668,089

(22) Filed: May 17, 2024

(65) Prior Publication Data

US 2025/0353338 A1 Nov. 20, 2025

(51) Int. Cl.
*B60D 1/66* (2006.01)
*B60B 33/08* (2006.01)

(52) U.S. Cl.
CPC .............. *B60D 1/665* (2013.01); *B60B 33/08* (2013.01)

(58) Field of Classification Search
CPC ................................ B60B 33/08; B60D 1/665
See application file for complete search history.

(56) References Cited

U.S. PATENT DOCUMENTS

| | | | | |
|---|---|---|---|---|
| 9,796,213 | B1 * | 10/2017 | Menard | B60B 19/003 |
| 11,241,910 | B2 * | 2/2022 | Wilbur | B60B 33/0063 |
| 12,409,689 | B2 * | 9/2025 | Schmidt | B60B 19/14 |
| 2009/0293227 | A1 * | 12/2009 | Wang | B60B 33/08 16/26 |
| 2022/0388337 | A1 * | 12/2022 | Aulick | B60B 33/08 |
| 2024/0208651 | A1 * | 6/2024 | Eijkelenboom | B64D 11/0007 |

FOREIGN PATENT DOCUMENTS

| | | | | |
|---|---|---|---|---|
| CN | 2889755 Y * | 4/2007 | | |
| FR | 2728831 A1 * | 7/1996 | | B60B 33/08 |

* cited by examiner

*Primary Examiner* — Kevin Hurley

(57) ABSTRACT

A wheel assembly for use with a trailer jack includes an outer shell defining a main volume. The wheel assembly may further include a main ball configured to be at least partially contained within the main volume of the outer shell and to contact a ground surface. The wheel assembly may further include a bearing coupled between the main ball and the outer shell and configured to allow motion of the main ball relative to the outer shell. The wheel assembly may further include a coupler configured to couple the outer shell to a shaft of a trailer jack. The wheel assembly may further include a lock configured to retain the main ball in place relative to the outer shell.

20 Claims, 4 Drawing Sheets

SYSTEMS AND METHODS FOR IMPROVED TRAILER JACK WHEEL ASSEMBLIES

BACKGROUND

Field

The present disclosure is directed to systems and methods for improved trailers and, more particularly, for improved wheel assemblies for use with a trailer jack.

Description of the Related Art

Vehicles, such as cars, trucks, and buses, have been in use for many years. Trailers have been around for nearly as long and provide a means for hauling or towing items that otherwise would be inconvenient to move with a vehicle. For example, trailers may be used to tow other automobiles (e.g., a car that is broken down), alternative vehicles (e.g., boats), animals (e.g., horses or cows), or other bulky loads (e.g., hay or similar). Most trailers are designed to be removably coupled to vehicles for various reasons (e.g., so the vehicles may be driven without the additional load, so different trailers suited for different items may be coupled to the same vehicle, etc.). In that regard, a conventional trailer includes a chassis for supporting items, an axle assembly having wheels to allow the chassis to move with the vehicle, a trailer coupler for coupling the chassis to the vehicle, and a trailer jack. A trailer jack may include a shaft coupled to the chassis of the trailer, a wheel that may contact a ground surface, and a lift mechanism (e.g., a jack) coupled to the shaft to increase or decrease a distance between the coupler of the trailer and the ground surface.

Wheels of trailer jacks conventionally include caster wheels. Caster wheels are limited in motion which, combined with a potentially heavy trailer and supported items, may present difficulty in aligning the coupler of the trailer with a trailer hitch of a vehicle. Due to the difficulty in moving a trailer using a caster wheel, two or more individuals may be needed to couple a trailer to a vehicle (one individual to drive the vehicle and another to remain with the trailer and instruct the driver of the vehicle to align the coupler with the trailer hitch). However, there are times when it would be desirable for a single individual to couple a trailer to a vehicle without assistance. In addition, improved ease of tasks is generally advantageous.

Thus, there is a need in the art for systems and methods for improved wheels for use with trailer jacks of trailers.

SUMMARY

Described herein is a wheel assembly for use with a trailer jack. The wheel assembly includes an outer shell defining a main volume. The wheel assembly may further include a main ball configured to be at least partially contained within the main volume of the outer shell and to contact a ground surface. The wheel assembly may further include a bearing coupled between the main ball and the outer shell and configured to allow motion of the main ball relative to the outer shell. The wheel assembly may further include a coupler configured to couple the outer shell to a shaft of a trailer jack. The wheel assembly may further include a lock configured to retain the main ball in place relative to the outer shell.

Also described is a trailer jack. The trailer jack includes a trailer end configured to be coupled to a trailer. The trailer jack further includes a wheel end. The trailer jack further includes a shaft extending from the trailer end to the wheel end. The trailer jack further includes a wheel assembly coupled to the wheel end of the trailer jack. The wheel assembly includes an outer shell defining a main volume. The wheel assembly further includes a main ball configured to be at least partially contained within the main volume of the outer shell and to contact a ground surface. The wheel assembly further includes a bearing coupled between the main ball and the outer shell and configured to allow motion of the main ball relative to the outer shell. The wheel assembly further includes a lock configured to retain the main ball in place relative to the outer shell.

Also described is a trailer for use with a vehicle. The trailer includes a chassis configured to support a load, a trailer coupler configured to be coupled to the vehicle, and a trailer jack. The trailer jack includes a trailer end configured to be coupled to the chassis, a wheel end, a shaft extending from the trailer end to the wheel end, and a wheel assembly coupled to the wheel end of the trailer jack. The wheel assembly includes an outer shell defining a main volume. The wheel assembly further includes a main ball configured to be at least partially contained within the main volume of the outer shell and to contact a ground surface. The wheel assembly further includes a bearing coupled between the main ball and the outer shell and configured to allow motion of the main ball relative to the outer shell. The wheel assembly further includes a lock configured to retain the main ball in place relative to the outer shell.

BRIEF DESCRIPTION OF THE DRAWINGS

Other systems, methods, features, and advantages of the present disclosure will be or will become apparent to one of ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

The present disclosure describes systems and methods for improved wheel assemblies for use with trailer jacks. An exemplary wheel assembly may include a spherical wheel that may roll in any direction parallel to a ground surface on which it is resting. The wheel assembly may also include an outer shell that defines a main volume and a main ball to be received by, and retained in, the main volume. The system may further include a bearing designed to be positioned between the outer shell and the main ball to facilitate movement (such as rotation) of the main ball relative to the outer shell. The system may also include a coupler designed to couple the wheel assembly to a shaft of a trailer jack, and a lock to retain the main ball in place relative to the outer shell.

Benefits and advantages of the present disclosure are readily apparent. These benefits and advantages include the ability for the wheel assembly of a trailer jack to move in any direction parallel to a ground surface (i.e., it may move in any direction along the ground surface). This improved movement of the wheel assembly advantageously allows a coupler of a trailer to more easily be aligned with a trailer hitch of a vehicle, which provides the benefit of improved ease of coupling a trailer to a vehicle. This improved ease of coupling provides the advantage of allowing a single individual to couple the trailer to the vehicle without assistance from a second individual. This improved movement also allows a trailer to be more easily moved to a desired location and orientation for storage when decoupled from the vehicle. The main ball of the wheel assembly may be replaceable, advantageously allowing replacement of a portion of the wheel assembly instead of replacement of the entire wheel assembly, thus saving money after prolonged use of the trailer. The wheel assembly may further advantageously be designed to replace existing wheels of trailers, thus allowing use of the improved wheel assembly with existing trailers that originally included caster wheels coupled to the trailer jack.

Figure 1:
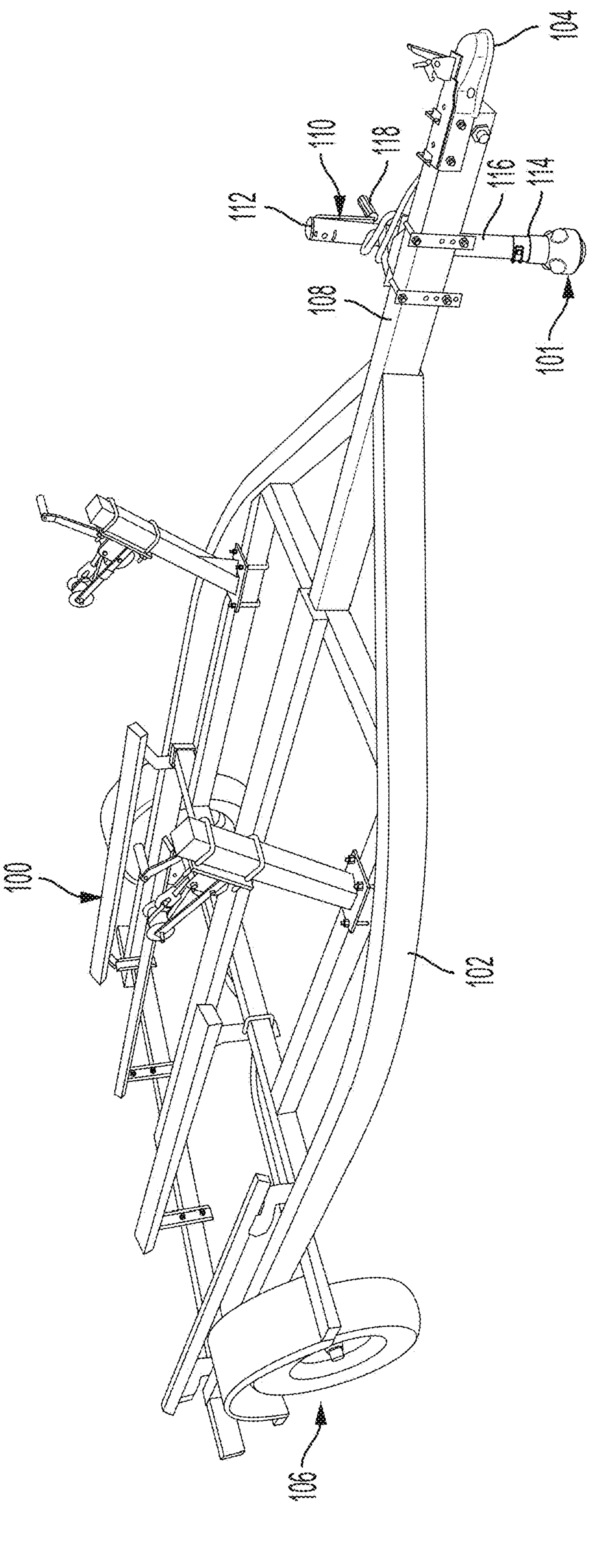
FIG. 1 is a perspective view of a trailer having a wheel assembly, in accordance with various embodiments of the present disclosure.
Figure 2:
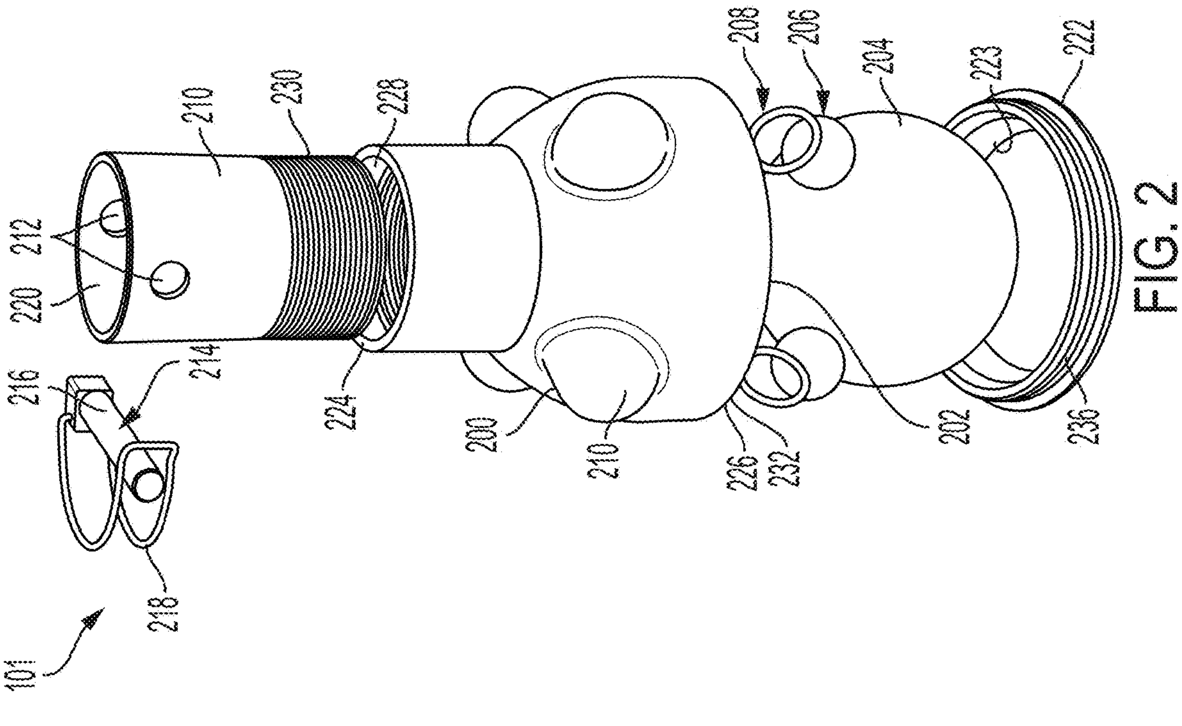
FIG. 2 is an exploded view of the wheel assembly of FIG. 1, in accordance with various embodiments of the present disclosure.
Figure 3:
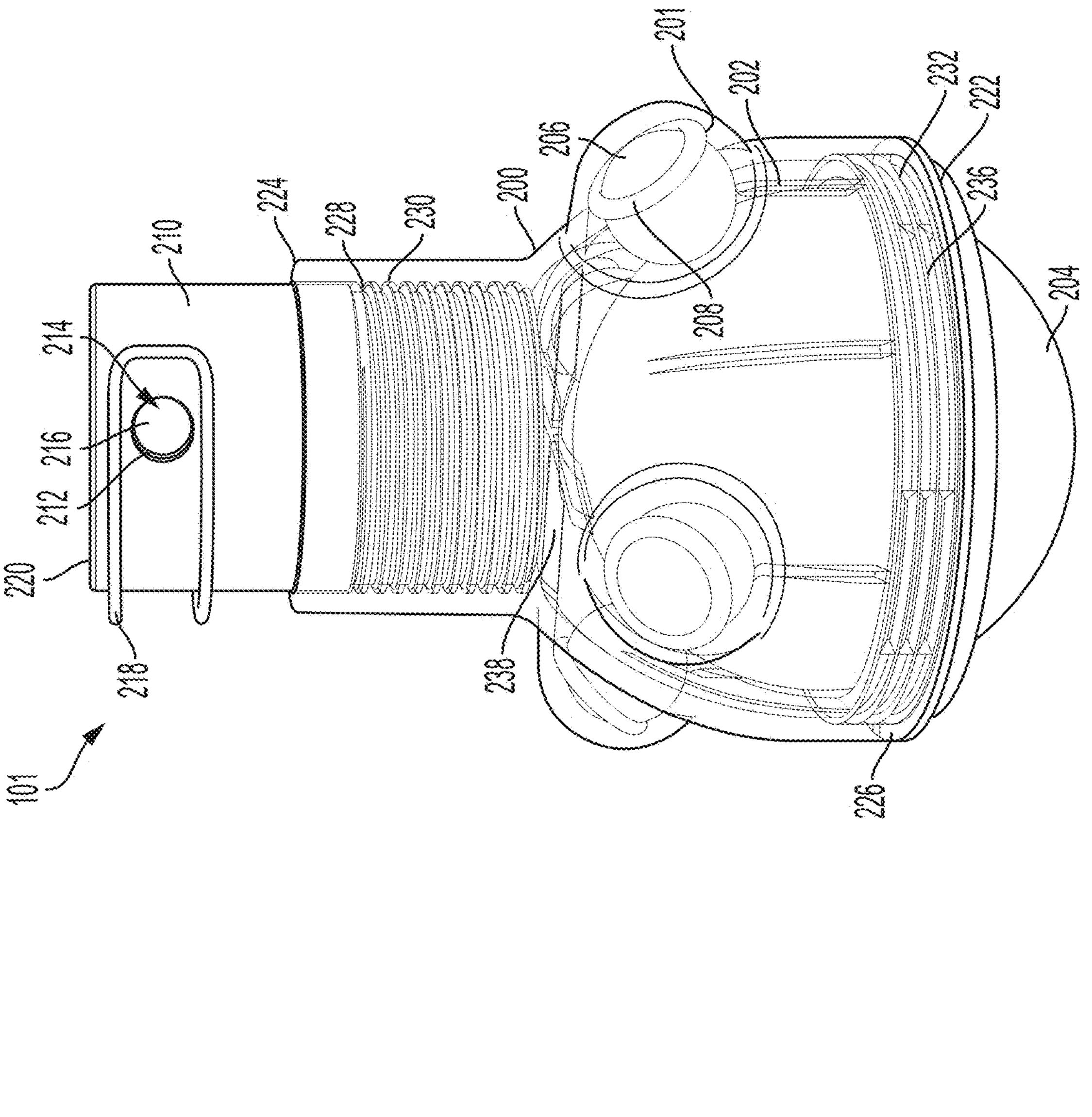
FIG. 3 is a side view of the wheel assembly of FIG. 1 in an assembled state and with an outer shell being clear, in accordance with various embodiments of the present disclosure.
Figure 4B:
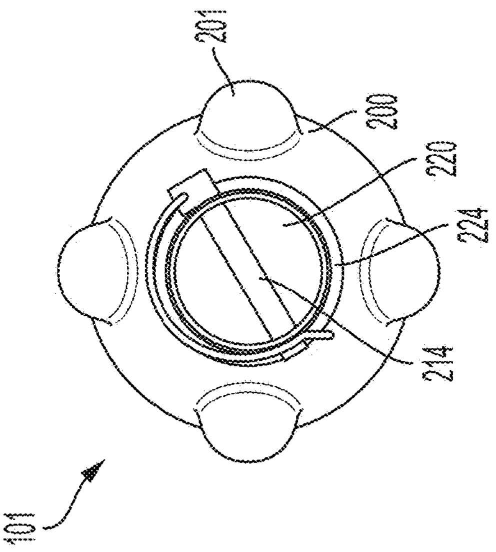
FIGS. 4A, 4B, and 4C are a side view, a top-down view, and a bottom-up view, respectively, of the wheel assembly of FIG. 1 in an assembled state, in accordance with various embodiments of the present disclosure.
Figure 4C:
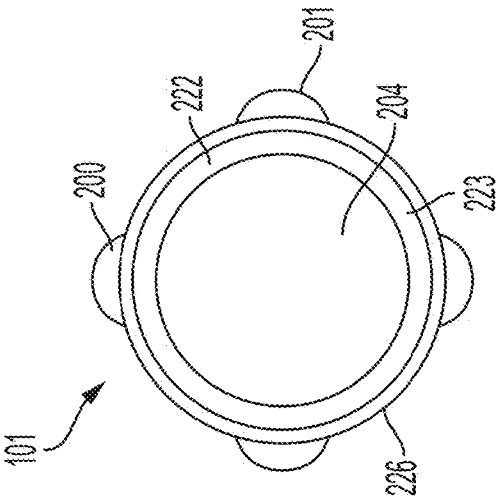
Figure 4A:
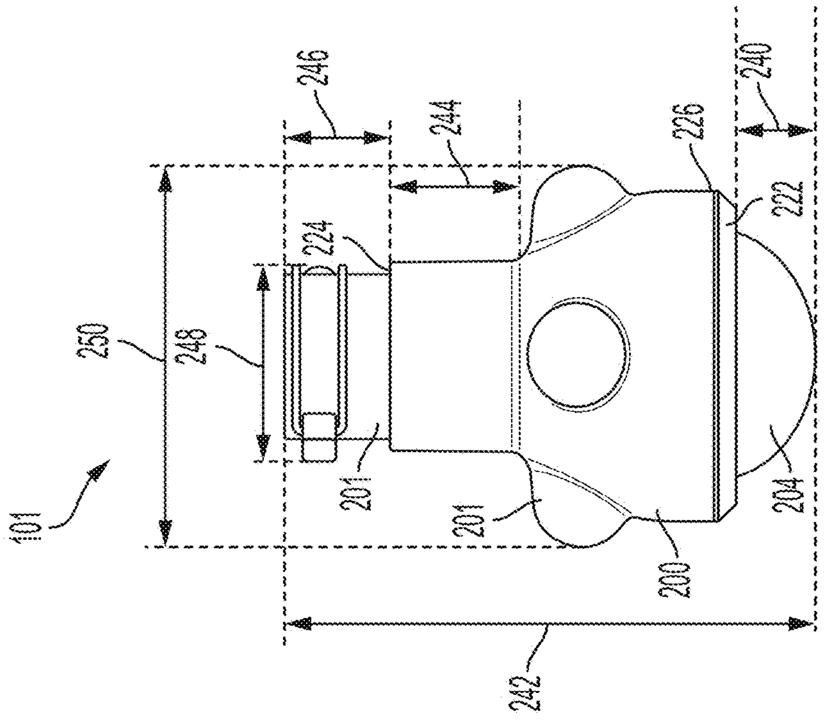

Referring now to FIG. 1, a trailer 100 may include a trailer jack 110 with an improved wheel assembly 101. In some embodiments, the wheel assembly 101 may be referred to as a spherical wheel because the portion of the wheel assembly 101 that contacts a ground surface includes a portion of a sphere. The trailer 100 may include a chassis 102. The chassis 102 may have any shape or design of a trailer chassis and may serve any purpose. As shown, the chassis 102 may be designed to receive and support a boat. However, any type of chassis 102 may be used with the wheel assembly 101 such as a chassis to support a mobile home, a chassis to transport equipment (e.g., lawnmowers, hay, or the like), a chassis to support bicycles or motorcycles, or the like.

The trailer 100 may also include a trailer coupler 104. The trailer coupler 104 may be designed to couple the chassis 102 to a vehicle such as a car, truck, or sports utility vehicle (SUV). As shown, the trailer coupler 104 is designed to have a cavity that receives and rests upon a trailer hitch ball coupled to a vehicle via a trailer hitch. In that regard, the cavity of the trailer coupler 104 may at least partially include a spherical or ball shape. Additional equipment may be included with the trailer coupler 104 such as a chain to support the connection to the vehicle, one or more cables to port at least one of electrical power or signals (e.g., signals to control turn indicators of the trailer 100) from the vehicle to the trailer 100, one or more additional locking mechanism to reduce the likelihood of separation of the trailer coupler 104 from the vehicle, or the like.

The trailer 100 may further include an axle assembly 106 coupled to the chassis 102. The axle assembly 106 may include one or more wheels configured to rest upon, and move relative to, a ground surface. The axle assembly 106 may support the chassis 102 and facilitate movement of the chassis 102 with the vehicle along the ground surface.

The trailer 100 may have a tongue 108 extending away from the chassis 102. The tongue 108 may include or be coupled to the trailer coupler 104. In that regard, the tongue 108 may be said to couple the chassis 102 to the trailer coupler 104 and, thus, the vehicle.

The trailer 100 may also include the trailer jack 110, which may be coupled to at least one of the chassis 102 or the tongue 108. The trailer jack 110 may have a trailer end 112, a wheel end 114, and a shaft 116 therebetween. The trailer jack 110 may also include the wheel assembly 101 coupled to the wheel end 114 of the trailer jack 110. The trailer jack 110 may also include a lift mechanism that adjusts a distance between the tongue 108 (or chassis 102) of the trailer 100 and the wheel assembly 114. The lift mechanism may include any lift mechanism that can adjust the distance from the tongue 108 to the wheel assembly 101. For example, the lift mechanism may include one or more gears and a hand crank (e.g., a jack), may include an electric motor, or the like.

In some embodiments, a wheel assembly having similar features as the wheel assembly 101 may be used with another portion of a trailer, for example, as replacements for the rear wheels on the axle assembly 106. In some embodiments, a trailer jack 110 may lack a lift mechanism. For example, a separate lift mechanism may be coupled to the trailer 100 such that the wheel assembly 101 of the trailer jack 110 without the lift mechanism supports the trailer 100 until the separate lift mechanism lifts the trailer 100 by a sufficient amount to lift the wheel assembly 101 from the ground. For the purposes of the present disclosure, a trailer jack may refer to any component of a trailer that includes at least one wheel and is designed to at least partially support the trailer. In some embodiments, a trailer jack may be coupled to a tongue of a trailer.

The wheel assembly 101 may rest upon, and move along, a ground surface. The wheel assembly 101 (along with the trailer jack 110) may support a front end of the trailer 100 (i.e., an end of the trailer chassis 102 closest to the trailer coupler 104) above a ground surface. In that regard, the wheel assembly 101 and the trailer jack 110 may, together with the axle assembly 106, support the chassis 102 and any load thereon in response to the trailer 100 being decoupled from any vehicle. The wheel assembly 101 may also be used to assist with alignment of the trailer coupler 104 to a trailer hitch of a vehicle as the wheel assembly 101 may move in any direction along the ground surface.

To decouple the trailer 100 from a vehicle, the trailer jack 110 may be oriented as shown in FIG. 1 such that the wheel assembly 101 contacts a ground surface. Any lock or other connection (e.g., an electric cable) between the trailer coupler 104 and the trailer hitch of the vehicle may be unlocked. The lift mechanism 118 may then be actuated to extend a distance between the wheel assembly 101 and the tongue 108, thus raising the trailer coupler 104 away from the trailer hitch ball and, thus, decoupling the trailer coupler 104 from the trailer hitch. Once the trailer coupler 104 is cleared from contact with the trailer hitch ball, the vehicle may be driven away and the trailer 100 may support itself and any load thereon. Because of the design of the wheel assembly 101, the trailer 100 may be moved to a desired location and orientation by hand (e.g., an individual may grip the tongue 108 and manually move the trailer 100 to a desired location).

To couple the trailer 100 to a vehicle, the trailer jack 110 and the wheel assembly 101 may be oriented as shown in FIG. 1 such that the trailer jack 110 supports a front end of the chassis 102. A vehicle may then be moved such that the trailer hitch ball is relatively close to the trailer coupler 104. Because of the wheel assembly 101 used in the trailer jack 110, the tongue 108 and the trailer coupler 104 of the trailer may be manually moved relative to a ground surface to align the trailer coupler 104 with the trailer hitch ball. Once the trailer coupler 104 is aligned with the trailer hitch ball, the lift mechanism 118 may be actuated to reduce the distance between the wheel assembly 101 and the tongue 108. This distance may be reduced until the trailer coupler 104 rests upon the trailer hitch ball such that the front end of the trailer 100 is supported by the trailer hitch rather than the trailer jack 110. At this point, any locking mechanism may be engaged to secure the connection between the trailer coupler 104 and the trailer hitch ball, any electrical cables may be connected, and any chains may be coupled to the trailer 100 and the vehicle to further secure the connection. In some embodiments, the trailer jack 110 may then be actuated to cause the shaft 116 to be oriented parallel relative to the tongue 108 to reduce the likelihood of the wheel assembly 101 contacting the ground surface during towing of the trailer 100.

Conventional wheel assemblies used with trailer jacks include caster wheels. Some conventional trailer jacks only include flat support plates that rest on a ground surface without the ability to move the trailer jack along the ground. Caster wheels are limited in movement, especially when supporting a trailer with significant mass thereon. Because of the limited movement, difficulty arises when attempting to align a trailer coupler with a trailer hitch ball. Difficulty may also arise when attempting to maneuver a trailer that is decoupled from a vehicle to a desired location and orientation (e.g., for storage). The wheel assembly 101 disclosed herein includes a new design that overcomes these difficulties.

Turning now to FIGS. 2, 3, 4A, 4B, and 4C, additional details of the wheel assembly 101 will now be discussed. The wheel assembly 101 may include an outer shell 200 that defines a main volume 202. The wheel assembly 101 may further include a main ball 204 designed to be received by the main volume 202 of the outer shell 200, and capable of rotating relative to the outer shell 200. In that regard, the main volume 202 may have a shape that at least partially matches that of the main ball 204.

The wheel assembly 101 may further include a bearing 206 located between the outer shell 200 and the main ball 204. The bearing 206 may facilitate rotation or other movement of the main ball 204 relative to the outer shell 200. In some embodiments, the bearing 206 may include one or more ball bearings 206; for example, the bearing 206 may include 4 ball bearings, 3 ball bearings, 6 ball bearings, or the like. In some embodiments, the bearing 206 may include any other bearing instead of, or in addition to, the ball bearings. For example, the bearing 206 may include a roller bearing, a plain bearing, a spherical roller bearing, or the like. The outer shell (or the main ball 204, the bearing 206, or other component) may include a feature designed to retain the bearing 206 in place relative to the outer shell 200 and the main ball 204 (i.e., between portions of the outer shell 200 and the main ball 204 that are designed to move relative to each other).

In some embodiments and as shown in the drawings, the outer shell 200 may define a plurality of pockets 201. An inner surface of each of the pockets 201 may have at least a partially spherical shape (at least partially corresponding to a shape of the ball bearing 206), and each pocket of the plurality of pockets 201 may be designed to receive and at least partially house at least one of the ball bearings 206. When the main ball 204 is housed and retained within the main volume 202 (as further discussed below), the ball bearings 206 may be retained in place within the pockets 201 due to the relatively small distance between the main ball 204 and an inner surface of the outer shell 200. In some embodiments, the ball bearings 206 may be the only point of contact between the main ball 204 and the outer shell 200. In response to rotation of the main ball 204 relative to the outer shell 200 (e.g., when the wheel assembly 101 is moved along a ground surface), the ball bearings 206 may also rotate, allowing rotation of the main ball 204 relative to the outer shell 200. Using a bearing 206 between the main ball 204 and the outer shell 200 reduces or eliminates friction between the main ball 204 and the outer shell, facilitating relatively easy rotation of the main ball 204 relative to the outer shell and, thus, easing the ability of the wheel assembly 101 to move along a ground surface. In some embodiments, the outer shell 200 may bulge outward (i.e., away from the main ball 204) where the pockets 201 are defined. The outward bulge may have a similar shape as the pocket 201; as shown, the bulges have a partially spherical shape to correspond to the shape of the ball bearings 206 and the pockets 201.

In some embodiments, a material with a relatively low coefficient of friction may be positioned between the ball bearings 206 and an inner surface of a respective pocket 201. For example, the material may be provided as one or more O-rings 208 each positioned between a ball bearing 206 and an inner surface of a respective pocket 201. The O-rings 208 may each have a diameter that is less than a diameter of a corresponding ball bearing 206 such that the O-rings remain positioned between the ball bearings 206 and an inner surface of the pockets 201. The O-rings 208 may be formed using a relatively lubricous material. The material of the O-rings 208 may be formed using a material with a relatively low coefficient of friction, such as a coefficient of friction of less than or equal to 0.3, a coefficient of friction of less than or equal to 0.2, a coefficient of friction less than or equal to 0.1, a coefficient of friction of less than or equal to 0.05, or the like. For example, the O-rings 208 may be formed using polytetrafluoroethylene (PTFE), nylon, nylon with additives (such as NYLOIL), ultra high molecular weight polyethylene (UHMW), polyethylene terephthalate (PET), or the like. In some embodiments, the O-rings 208 may include other materials combined with fillers having a relatively low coefficient of friction such as graphite, hexagonal boron nitride, PTFE, paraffin wax, molybdenum disulfide, or the like. Use of the O-ring 208 between the ball bearings 206 and the inner surface of the pockets 201 reduces friction between the ball bearings 206 and the outer shell 200, thus also reducing friction between the main ball 204 and the ball bearings 206 (because the ball bearings 206 may rotate more freely relative to the outer shell 200).

In some embodiments, at least one of the main ball 204, the ball bearings 206, or the outer shell 200 may be formed using a material with a relatively low coefficient of friction, reducing friction between the main ball 204, the ball bearings 206, and the inner surface of the pockets 201 without use of any O-rings. However, it may be desirable for at least the main ball 204 to have a sufficiently high coefficient of friction such that sufficient friction exists between the main ball 204 and the ground surface to allow the main ball 204 to grip the ground surface. This increased friction may be achieved using certain materials with a relatively great coefficient of friction, by making the surface of the main ball 204 rough, or any combination thereof.

The outer shell 200 may have a first end 224 designed to be coupled to a trailer jack, and a second end 226 designed to be closer to the ground surface during use of the wheel assembly than the first end 224. The second end 226 may at least partially define the main volume 202 such that the main ball 204 may be placed in the main volume 202 via the second end 226 of the outer shell 200. The wheel assembly 101 may include a coupler 210 coupled to the first end 224 of the outer shell 200 and designed to couple the outer shell 200 to a trailer jack (e.g., the trailer jack 110 of FIG. 1). In some embodiments, the features of the coupler 210 may be incorporated into the outer shell 200 such that the outer shell 200 is coupled to the trailer jack and use of a coupler is unnecessary.

The coupler 210 may have a tubular shape (i.e., it may have a body with an elongated annular shape) and, thus, may define a cavity 220 therein. The cavity 220 may be designed to receive a shaft of a trailer jack (such as the shaft 116 of FIG. 1), and the shaft and coupler 210 may be connected together to couple the wheel assembly 101 to the trailer jack. The cavity 220 may be designed to receive shafts having any shape or dimensions. For example, the coupler 210 (with the cavity 220) and the respective shaft may each have a rectangular shape, a triangular shape, or the like. Similarly, the diameter of the cavity 220 and the respective shaft may vary based on the specific use and specific trailer jack with which the wheel assembly 101 is designed to be used. In some embodiments, multiple couplers may be sold with such that an end user can select a coupler that best fits the specific trailer jack.

In some embodiments, the coupler 210 may be welded to the outer shell. In some embodiments, one or more connector may be used to couple the coupler 210 to the outer shell 200. For example, the outer shell 200 may include a first connector 228 and the coupler may include a second connector 230 designed to interface with and connect to the first connector 228. For example, the first connector 228 may include screw threading on an inner surface of the outer shell 200 at the first end 224 of the outer shell; and the second connector 230 may include screw threading on an outer surface of the coupler 210 at an end of the coupler 210 that is coupled to the outer shell 200. In order to couple the coupler 210 to the outer shell 200, the coupler 210 may be aligned with the outer shell 200 such that the threading of the second connector 230 is aligned with the threading of the first connector 228, and the coupler 210 may be rotated relative to the outer shell 200 to cause the first connector 228 to engage with, and be coupled to, the second connector 230. In some embodiments, any additional or alternative connectors may be used to couple the coupler 210 to the outer shell 200 such as bolts, snap-fit connectors, an interference fit, or any other known connection means. In some embodiments, the outer shell 200 may be designed to be coupled directly to the trailer jack without use of a coupler.

As indicated above, the coupler 210 is designed to be coupled to a trailer jack, such as the trailer jack 110 of FIG. 1. The coupler 210 may include or define a cavity 220 extending along a longitudinal axis of the coupler 210. The coupler 210 may further define apertures 212 extending through the body of the coupler 210; the apertures 212 may be aligned on opposite sides of the coupler 210. To couple a trailer jack to the coupler 210, a shaft (such as the shaft 116 of the trailer jack 110 of FIG. 1) may be inserted into the cavity 220. The shaft may include apertures that may be aligned with the apertures 212 of the coupler 210. A lock pin 214 may include a pin 216 and a lock 218. When the apertures of the shaft are aligned with the apertures 212 of the coupler 210, the pin 216 of the lock pin 214 may be extended into the apertures 212 of the coupler 210 and the corresponding apertures of the shaft. While the pin 216 is positioned within each of the apertures, the lock 218 may be rotated to extend around a circumference of the coupler 210, thus locking the pin 216 in place through the coupler 210 and the shaft of the trailer jack. In some embodiments, a cavity of the shaft may receive the coupler 210; in such embodiments, the lock pin 214 may function similarly except that the lock 218 may extend around a circumference of the shaft rather than a circumference of the coupler 210. In some embodiments, other connectors may be used in place of the lock pin 214 to couple the wheel assembly 101 to the trailer jack. In some embodiments, the coupler 210 or the outer shell 200 may be permanently coupled to the shaft of the trailer jack such as by use of an adhesive, by welding, or the like.

In some embodiments, the wheel assembly 101 may include a feature that functions to retain the main ball 204 in place within the main volume 202 and relative to the outer shell 200. For example, the wheel assembly 101 may include a lock 222 positioned at and removably coupled to the second end 226 of the outer shell 200. The lock 222 may be coupled to the second end 226 of the outer shell 200 and may define or include an edge 223 that extends radially inward relative to a circular perimeter of the second end 226 of the outer shell 200 when the lock 222 is coupled to the outer shell 200. A diameter of the edge 223 of the lock 222 may be less than a diameter of the main ball 204, thus retaining the main ball 204 within the main volume 202 of the outer shell 200 when the lock 222 is coupled to the outer shell 200.

The second end 226 of the outer shell 200 may include a third connector 232 and the lock 222 may include a fourth connector 236 that is designed to interface with and connect to the third connector 232 (to couple the lock 222 to the second end 226 of the outer shell 200). In some embodiments, the third connector 232 may include screw threading on an inner surface of the outer shell 200 at the second end 226. In some embodiments, the fourth connector 236 may include screw threading on an outer surface of the lock 222. To couple the lock 222 to the outer shell 200, the lock 222 may be aligned with the second end 226 of the outer shell 200 (with the main ball 204 positioned in the main volume 202) and rotated relative to the outer shell 200 to cause the third connector 232 to engage with and couple to the fourth connector 236. In that regard, the lock 222 may have an annular shape with screw threading on an outer surface of the annular shape such that the annular lock 222 may be attached to the outer shell 200 by aligning the threadings and rotating the annular lock 222 relative to the outer shell 200. In some embodiments, any other known connection means may be used to couple the lock 222 to the outer shell 200 in place of screw threading, such as a snap-fit connector, a bolt, adhesive, an interference fit, or the like.

When the lock 222 is engaged with the outer shell 200 and the main ball 204 is within the main volume 202, the main ball 204 may be retained in place within the main volume 202 between the outer shell 200 and the lock 222 due to the diameter of the lock 222 being less than the diameter of the main ball 204.

During use of the wheel assembly 101, the main ball 204 may contact a ground surface. Gravity may apply a downward force from the outer shell 200 to the main ball 204 via the ball bearings 206. A stop 238 may be used between the main volume 202 of the outer shell 200 and the cavity 220 of the coupler 210. The stop 238 may be formed as part of the outer shell 200, as part of the coupler 210, or as a separate component that includes features or connectors that retain the stop 238 in place during use of the wheel assembly 101. The stop 238 may reduce the likelihood of the main ball 204 or debris reaching the cavity 220 of the coupler 210, and may similarly reduce the likelihood of the coupler 210 or any component in the cavity 220 of the coupler 210 extending into the main volume 202. For example, the stop 238 may reduce the likelihood of contact between the main ball 204 and a shaft of a trailer jack coupled to the wheel assembly 101. The coupler 210 may include any material or shape that at least partially separates the main volume 202 from the cavity 220 of the coupler 210. In some embodiments, the stop 238 may contact the main ball during use of the wheel assembly.

In that regard, it may be desirable for the stop 238 to be formed using a material having a relatively low coefficient of friction (e.g., less than 0.3, less than 0.2, less than 0.1, less than 0.05, or the like). For example, the stop 238 may be formed using any one or more of polytetrafluoroethylene (PTFE), nylon, nylon with additives (such as NYLOIL), ultra high molecular weight polyethylene (UHMW), polyethylene terephthalate (PET), or the like. In some embodiments, the stop 238 may include other materials combined with fillers having a low coefficient of friction such as graphite, hexagonal boron nitride, PTFE, paraffin wax, molybdenum disulfide, or the like.

In some embodiments, the main ball 204 may fail to contact the lock 222 when the wheel assembly 101 is in use (i.e., when the wheel assembly 101 is supporting a mass). However, in some embodiments, a tighter fit may be desired such that the lock 222 maintains contact with the main ball 204 during use of the wheel assembly. In such embodiments, it may be desirable for at least one of the lock 222 or the main ball 204 to have a relatively low coefficient of friction (e.g., less than 0.3, less than 0.2, less than 0.1, less than 0.05, or the like). In that regard at least one of the main ball 204 or the lock 222 may be formed using a material with a relatively low coefficient of friction, or may include a coating having a relatively low coefficient of friction.

Various components of the wheel assembly 101 may be formed using various materials, and these materials may be selected based on the specific role of the component in question. For example and as discussed above, it may be desirable for the O-rings 208 to have a relatively low coefficient of friction as they remain in contact with the ball bearings 206, and the material of the O-rings 208 may be selected based on this desired property of the O-rings. Any components of the wheel assembly 101 (e.g., the outer shell 200, the main ball 204, the ball bearings 206, the O-rings 208, the coupler 210, the lock pin 214, the lock 222, and the stop 238) may include any known materials. For example, any one or more of these components may include at least one of a plastic, polytetrafluoroethylene (PTFE), nylon, polyvinyl chloride (PVC), polyethylene terephthalate (PET), polypropylene (PP), polyamide, polyether ether ketone (PEEK), other polymers, metal or metal alloy, or the like.

In some embodiments, the main ball 204 and the O-rings 208 may be formed using PTFE, the outer shell 200 may be formed using an extruded polyamide six with a fiberglass content of 30 percent (PA6+30GF), and the ball bearings 206, the coupler, the lock pin 214, and the lock 222 may be formed using a metal such as chrome steel. However, the material of any of these components may change without departing from the scope of the present disclosure.

The wheel assembly 101 and components thereof may be formed to have any dimensions; in some embodiments, the dimensions may be selected based on the intended use of the wheel assembly 101. When the wheel assembly 101 is assembled, the main ball 204 may extend beyond the lock 222 by a distance 240; in some embodiments, the distance 240 may be between 0.25 inches and 5 inches, between 0.5 inches and 3 inches, between 1 and 1.5 inches, or approximately 1.15 inches (where used in this context, "approximately" refers to the referenced value plus or minus 10 percent of the referenced value). Similarly, when assembled, the wheel assembly 101 may have a total height 242 from the end of the main ball 204 to the distal end of the coupler 210; in some embodiments, the height 242 may be between 2 inches and 24 inches, between 3 inches and 15 inches, between 5 inches and 10 inches, or approximately 7.65 inches. The outer shell 200 may have a distance 244 extending from an upper end of the main volume 202 to the first end 224; in some embodiments, the distance 244 may be between 0.5 inches and 10 inches, between 1 inch and 5 inches, between 1 inch and 2 inches, or approximately 1.875 inches. When the wheel assembly 101 is assembled, the coupler 210 may extend beyond the first end 224 of the outer shell 200 by a distance 246; in some embodiments, the distance 246 may be between 0.5 inches and 10 inches, between 1 inch and 5 inches, between 1 inch and 2 inches, or approximately 1.5 inches. The coupler 210 may have a diameter 248; in some embodiments, the diameter 248 of the coupler 210 may be between 0.5 inches and 10 inches, between 1 inch and 5 inches, between 2 inches and 3 inches, or approximately 2.36 inches. The outer shell 200 may have a width 250 extending from an outer edge of one pocket 201 to an outer edge of an opposite pocket 201; in some embodiments, the width 250 may be between 1 inch and 20 inches, between 1 inch and 10 inches, between 3 inches and 7 inches, or approximately 5.5 inches.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wheel assembly for use with a trailer jack, the wheel assembly comprising:
- an outer shell defining a main volume;
- a main ball configured to be at least partially contained within the main volume of the outer shell and to contact a ground surface;
- a bearing coupled between the main ball and the outer shell and configured to allow motion of the main ball relative to the outer shell;
- a lock pin;
- a coupler configured to couple the outer shell to a shaft of a trailer jack and including an annular body that defines a cavity configured to receive a shaft of the trailer jack to couple the wheel assembly to the trailer jack, the annular body also defining two apertures such that the lock pin can extend through the two apertures and a shaft aperture of the shaft of the trailer jack to couple the shaft of the trailer jack to the coupler; and
- a lock configured to retain the main ball in place relative to the outer shell.

2. The wheel assembly of claim 1, wherein the bearing includes at least one ball bearing.

3. The wheel assembly of claim 2, wherein:
- the at least one ball bearing includes a plurality of ball bearings;

the outer shell defines a plurality of pockets each configured to receive one of the plurality of ball bearings; and each of the plurality of ball bearings contact the outer shell within a respective pocket and the main ball and allow motion of the main ball relative to the outer shell.

4. The wheel assembly of claim 1, wherein:

the outer shell has a first end and a second end such that the second end is configured to be closer to the ground surface when the wheel assembly is in use;

the coupler is configured to be coupled to the first end of the outer shell; and the second end of the outer shell at least partially defines the main volume.

5. The wheel assembly of claim 4, wherein the first end of the outer shell includes a first connector, the coupler includes a second connector, and the first connector of the outer shell is configured to be coupled to the second connector of the coupler to couple the coupler to the first end of the outer shell.

6. The wheel assembly of claim 4, wherein the first end of the outer shell is permanently coupled to the coupler.

7. The wheel assembly of claim 4, wherein the second end of the outer shell includes a third connector, the lock includes a fourth connector, and the third connector of the outer shell is configured to be coupled to the fourth connector of the lock to couple the lock to the second end of the outer shell and to retain the main ball in place relative to the outer shell.

8. The wheel assembly of claim 7, wherein the third connector includes screw threading defined by an inner surface of the second end of the outer shell, and the fourth connector includes screw threading defined by an outer surface of the lock.

9. The wheel assembly of claim 1, wherein at least one of the coupler or the outer shell includes a stop configured to be located between the cavity of the annular body and the main volume of the outer shell to reduce the likelihood of contact between the main ball and the shaft of the trailer jack.

10. A trailer jack, comprising:

a trailer end configured to be coupled to a trailer;

a wheel end;

a shaft extending from the trailer end to the wheel end; and a wheel assembly coupled to the wheel end of the trailer jack and having:

an outer shell defining a main volume, a main ball configured to be at least partially contained within the main volume of the outer shell and to contact a ground surface, a bearing coupled between the main ball and the outer shell and configured to allow motion of the main ball relative to the outer shell, a lock configured to retain the main ball in place relative to the outer shell, a coupler configured to couple the outer shell to the shaft and having an annular body defining a cavity that is configured to receive the shaft of the trailer jack to couple the wheel assembly to the shaft.

11. The trailer jack of claim 10, wherein:

the bearing includes a plurality of ball bearings;

the outer shell defines a plurality of pockets each configured to receive one of the plurality of ball bearings; and each of the plurality of ball bearings contact the outer shell within a respective pocket and the main ball and allow motion of the main ball relative to the outer shell.

12. The trailer jack of claim 10, wherein:

the outer shell has a first end and a second end such that the second end is configured to be closer to the ground surface when the wheel assembly is in use;

the second end of the outer shell at least partially defines the main volume and includes a third connector;

the lock includes a fourth connector; and the third connector of the outer shell is configured to be coupled to the fourth connector of the lock to couple the lock to the second end of the outer shell and to retain the main ball in place relative to the outer shell.

13. The trailer jack of claim 12, wherein the third connector includes screw threading defined by an inner surface of the second end of the outer shell, and the fourth connector includes screw threading defined by an outer surface of the lock.

14. A wheel assembly for use with a trailer jack, the wheel assembly comprising:

an outer shell defining a main volume;

a main ball configured to be at least partially contained within the main volume of the outer shell and to contact a ground surface;

a bearing coupled between the main ball and the outer shell and configured to allow motion of the main ball relative to the outer shell;

a coupler configured to couple the outer shell to a shaft of a trailer jack, the coupler including an annular body defining a cavity within the annular body that is configured to receive a shaft of the trailer jack to couple the wheel assembly to the trailer jack; and a lock configured to retain the main ball in place relative to the outer shell, wherein at least one of the coupler or the outer shell includes a stop configured to be located between the cavity of the annular body and the main volume of the outer shell to reduce the likelihood of contact between the main ball and the shaft of the trailer jack.

15. The wheel assembly of claim 14, wherein the bearing includes at least one ball bearing.

16. The wheel assembly of claim 15, wherein:

the at least one ball bearing includes a plurality of ball bearings;

the outer shell defines a plurality of pockets each configured to receive one of the plurality of ball bearings; and each of the plurality of ball bearings contact the outer shell within a respective pocket and the main ball and allow motion of the main ball relative to the outer shell.

17. The wheel assembly of claim 14, wherein:

the outer shell has a first end and a second end such that the second end is configured to be closer to the ground surface when the wheel assembly is in use;

the coupler is configured to be coupled to the first end of the outer shell; and the second end of the outer shell at least partially defines the main volume.

18. The wheel assembly of claim 17, wherein the first end of the outer shell includes a first connector, the coupler includes a second connector, and the first connector of the outer shell is configured to be coupled to the second connector of the coupler to couple the coupler to the first end of the outer shell.

19. The wheel assembly of claim 17, wherein first end of the outer shell is permanently coupled to the coupler.

20. The wheel assembly of claim 17, wherein the second end of the outer shell includes a third connector, the lock includes a fourth connector, and the third connector of the outer shell is configured to be coupled to the fourth connector of the lock to couple the lock to the second end of the outer shell and to retain the main ball in place relative to the outer shell.

* * * * *